United States Patent
Fleddermann et al.

(10) Patent No.: US 9,108,740 B2
(45) Date of Patent: Aug. 18, 2015

(54) METHOD FOR GENERATING HYDRAULIC POWER IN AN AIRCRAFT, USE OF A HYBRID POWER CONTROL UNIT AND DRIVE SYSTEM

(71) Applicant: AIRBUS OPERATIONS GMBH, Hamburg (DE)

(72) Inventors: Andreas Fleddermann, Bremen (DE); Mark Heintjes, Weyhe (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 165 days.

(21) Appl. No.: 13/946,422

(22) Filed: Jul. 19, 2013

(65) Prior Publication Data

US 2014/0027568 A1 Jan. 30, 2014

Related U.S. Application Data

(60) Provisional application No. 61/675,853, filed on Jul. 26, 2012.

(30) Foreign Application Priority Data

Jul. 26, 2012 (EP) .................................. 12178041

(51) Int. Cl.
*B64D 41/00* (2006.01)
*B64C 13/42* (2006.01)
*B64C 13/40* (2006.01)

(52) U.S. Cl.
CPC .............. *B64D 41/00* (2013.01); *B64C 13/40* (2013.01); *B64C 13/42* (2013.01); *Y02T 50/44* (2013.01)

(58) Field of Classification Search
CPC ........ B64C 13/42; B64C 13/40; B64C 13/36; B64C 13/28; B64D 41/00
See application file for complete search history.

(56) References Cited

U.S. PATENT DOCUMENTS 6,023,134 A * 2/2000 Carl et al. ..................... 318/140
2002/0113167 A1 8/2002 Albero et al.
(Continued)

FOREIGN PATENT DOCUMENTS

| CN | 1190161 A | 8/1998 |
|---|---|---|
| CN | 102046467 A | 5/2011 |

(Continued)

OTHER PUBLICATIONS

European Patent Office, Extended European Search Report for European Patent Application No. 12178041.5, mailed Feb. 18, 2013.
State Intellectual Property Office of the People'S Republic of China, Office Action in Chinese Patent Application No. 2013103116005 mailed Apr. 1, 2015.

*Primary Examiner* — Tien Dinh
*Assistant Examiner* — Richard R Green
(74) *Attorney, Agent, or Firm* — Ingrassia Fisher & Lorenz, P.C.

(57) ABSTRACT

A method for generating hydraulic power in an aircraft, the aircraft having a drive system comprising at least one transmission shaft connected to a power control unit, the power control unit having an electric motor and a hydraulic displacement machine connected to a differential gear unit for driving a common output shaft. The method includes switching the hydraulic displacement machine into a pump mode, arresting the output shaft, rotating the electric motor such that the hydraulic displacement machine is driven due to the arrested output shaft and supplying the fluid flow into a hydraulic system. A drive system of an aircraft may thereby be used for either moving control surfaces or for generating hydraulic power in an aircraft. This hydraulic power may be used to cover hydraulic load peaks during aircraft operation or to power hydraulic devices without the need of additional hydraulic power generation components.

6 Claims, 4 Drawing Sheets

(56) References Cited

U.S. PATENT DOCUMENTS

2011/0062282 A1 3/2011 Richter et al.
2013/0327887 A1* 12/2013 Dyckrup et al. ............. 244/99.9

FOREIGN PATENT DOCUMENTS

| | | |
|---|---|---|
| DE | 102010021576 A1 | 12/2011 |
| WO | 2009124027 A1 | 10/2009 |

* cited by examiner

METHOD FOR GENERATING HYDRAULIC POWER IN AN AIRCRAFT, USE OF A HYBRID POWER CONTROL UNIT AND DRIVE SYSTEM

CROSS-REFERENCE TO RELATED APPLICATIONS

This application claims priority to European Patent Application No. 12 178 041.5, filed Jul. 26, 2012, and to U.S. Provisional Patent Application No. 61/675,853, filed Jul. 26, 2012, which are each incorporated herein by reference in their entirety.

TECHNICAL FIELD

The technical field relates to a method for generating hydraulic power in an aircraft, the aircraft having a drive system comprising at least one transmission shaft connected to a hybrid power control unit, the use of a hybrid power control unit and a drive system comprising at least one transmission shaft connected to a hybrid power control unit.

BACKGROUND

In an aircraft, hydraulic power is usually generated by engine driven hydraulic pumps connected to two or more hydraulic line systems. For the purpose of increasing the redundancy or the capability of compensating load peaks in the hydraulic power demand, additional hydraulic pumps may be provided driven by dedicated electric motors.

Main hydraulic loads in an aircraft are hydraulic actuators connected to control surfaces such as ailerons, elevons and rudders, as well as landing gear actuators and cargo door actuators. During start and landing phases, high lift systems are commonly used for increasing the lift coefficient of the aircraft. Typically, high lift systems of commercial and military aircraft are powered by a drive system with a central power control unit (PCU), wherein the PCU may include at least one hydraulic motor.

Other objects, desirable features and characteristics will become apparent from the subsequent summary and detailed description, and the appended claims, taken in conjunction with the accompanying drawings and this background.

SUMMARY

Each hydraulic pump and each electric motor installed in the aircraft for driving a hydraulic pump increases the total weight of the aircraft. Accordingly, it may be desirable to provide a method and a system for generating hydraulic power with a sufficient redundancy and reducing the resulting weight at the same time.

According to various exemplary embodiments, a method for generating hydraulic power in an aircraft is provided, the aircraft having a drive system comprising at least one transmission shaft connected to a power control unit, the power control unit having an electric motor and a hydraulic displacement machine, both connected to a differential gear unit for driving a common output shaft. In one example, the method comprises hydraulic displacement machine arresting the output shaft of the differential gear, rotating the electric motor such that the hydraulic displacement machine is driven due to the arrested output shaft and supplying the fluid flow into a hydraulic system. The method according to the present disclosure thereby uses a hybrid PCU for generating hydraulic power in an aircraft.

PCUs may comprise two independent motors to provide a certain redundancy in driving the connected transmission shaft system. In the past, PCUs were mostly equipped with two hydraulic motors, while in modern hybrid PCUs an electric motor and a hydraulic motor are included. In a common design both motors are connected to a speed summing differential gear that has an output shaft driven by the two motors. Between each motor and a respective input shaft of the differential gear a brake is situated, which brake is released only when the respective motor is operated. Therefore, the output shaft of the differential gear is driven either by one of the two motors alone or by the two motors at the same time.

The PCU is usually positioned in the fuselage of the aircraft and is electrically connected to a computerized control, e.g. to two independent slat flap control computers (SFCC) for controlling and monitoring the drive system. The output shaft of the PCU is further mechanically connected to a transmission shaft system extending into the wings of the aircraft. The transmission shaft system thereby provides mechanical power to geared actuators at flap or slat panel drive stations distributed within the wings by means of one or more transmission shafts.

The electric motor may be realized as a digitally controlled brushless DC motor with a distinct reliability and efficiency. Its operation is usually established by a motor control electronic that interfaces with a slat flap control computer or any other control unit of the aircraft and an electrical bus bar. The motor control electronic thereby converts electric power as required for the operation of the brushless DC motor.

The hydraulic displacement machine may be realized by any suitable fluidic machine that allows an operation in a pump mode and a motor mode. A motor mode is necessary for operating the hydraulic displacement machine as a motor for driving the respective input shaft of the differential gear unit. The hydraulic displacement machine may comprise a means for switching the operation mode from a pump mode into a motor mode or vice versa, e.g. by means of a set of non-return valves allowing the supply of pressurized hydraulic fluid to the hydraulic displacement machine without flowing back into the hydraulic system and vice versa. In one example, the hydraulic displacement machine is an axial piston machine with a plurality of movably supported pistons controlled by a swivable swash plate, wherein the swash plate may be moved in two different directions over a center position. This allows to vary the displacement of the pistons as well as the flow direction.

In the method according to the present disclosure it is assumed that the transmission shaft is momentarily not rotated, i.e. when the high lift system is in a standby state. Thereby the output shaft of the differential gear is arrested, e.g. by means of a brake. Consequently, the two input shafts of the differential gear are coupled such that a rotation of one of the input shafts leads to the rotation of the other input shaft, usually in an opposite direction. Once the output shaft is arrested, the hydraulic displacement machine may be driven by the electric motor to generate hydraulic energy.

The fluid flow resulting from the rotation of the hydraulic displacement machine is then supplied into a hydraulic system to provide hydraulic power for hydraulic loads attached to the hydraulic system.

As the power control unit for driving slats and flaps of an aircraft is usually only operated during takeoff and landing phases, the PCU is not providing any function in a major part of a flight mission. By combining the generation of hydraulic power by means of the PCU in those time intervals that do not include any movement of slats, flaps or other PCU-driven high lift devices, additional hydraulic power may be generated without the necessity of operating a dedicated pump-motor-combination. As already present components may be used for providing an additional function thereby a clear weight advantage is achieved and dedicated pump-motor-combinations may be eliminated from the setup of the aircraft.

In one exemplary embodiment, arresting the output shaft comprises arresting at least one first brake connected to the at least one transmission shaft. By arresting the transmission shaft the output shaft is arrested as the transmission shaft is directly coupled to the output shaft. The at least one first brake may be an already present brake of the transmission shaft system or an additionally integrated brake.

In another embodiment, the at least one first brake is at least one wing tip brake. In common drive systems with a PCU and a transmission shaft system a wing tip brake (WTB) in each wing is mechanically connected to the transmission shaft and the wing structure for arresting and holding a respective transmission shaft in failure cases. By activating the wing tip brakes, the transmission shaft is arrested and therefore the output shaft of the differential gear unit, which is mechanically connected to the transmission shaft, is arrested, too. Hence, without the necessity of any additional components the advantages of the present disclosure may be achieved.

In one embodiment of the method, rotating the electric motor includes releasing a second brake at the electric motor and a third brake at the hydraulic displacement machine. These brakes are usually used for preventing the slip of one of the input shafts of the differential gear unit when exclusively the other input shaft is driven by one of the motors. In a common drive system, these brakes are automatically activated when the respective motor is not driven. The second brake may thereby be realized as a power-off brake that is released once the electric motor is powered. The third brake may be realized as a pressure-off brake and may be released once the hydraulic motor is pressurized.

In case the hydraulic pressure of the hydraulic system to which the hydraulic power is to be supplied is zero, the third brake may be released actively, for example by a brake release unit that is capable of applying a hydraulic pressure from another hydraulic system, that is realized as a brake release actuator or any other means.

Alternatively, the third brake may be realized as a power-off brake that is connected to the electric motor once the PCU is operated in a hydraulic pressure generation mode.

In another exemplary embodiment, a control unit controls at least one of the speed of the electric motor and a displacement of the hydraulic displacement machine for adjusting a resulting hydraulic pressure or flow rate. In a first control method the pressure in the hydraulic system is controlled by adjusting the displacement of the hydraulic displacement machine, e.g. by adjusting the swash plate. In a second control method the displacement of the hydraulic displacement machine is fixed, e.g. to a maximum value, wherein the flow rate is controlled by a continuous adjustment of the speed of the electric motor.

The various teachings of the present disclosure further relates to the use of a hybrid PCU comprising an electric motor and a hydraulic displacement machine connected to a differential gear unit having a common output shaft for generating hydraulic power under arresting the common output shaft.

In one of various embodiments, at least one wing tip brake connected to a transmission shaft system mechanically connected to the output shaft of the differential gear unit arrest the transmission shaft system for arresting the common output shaft.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
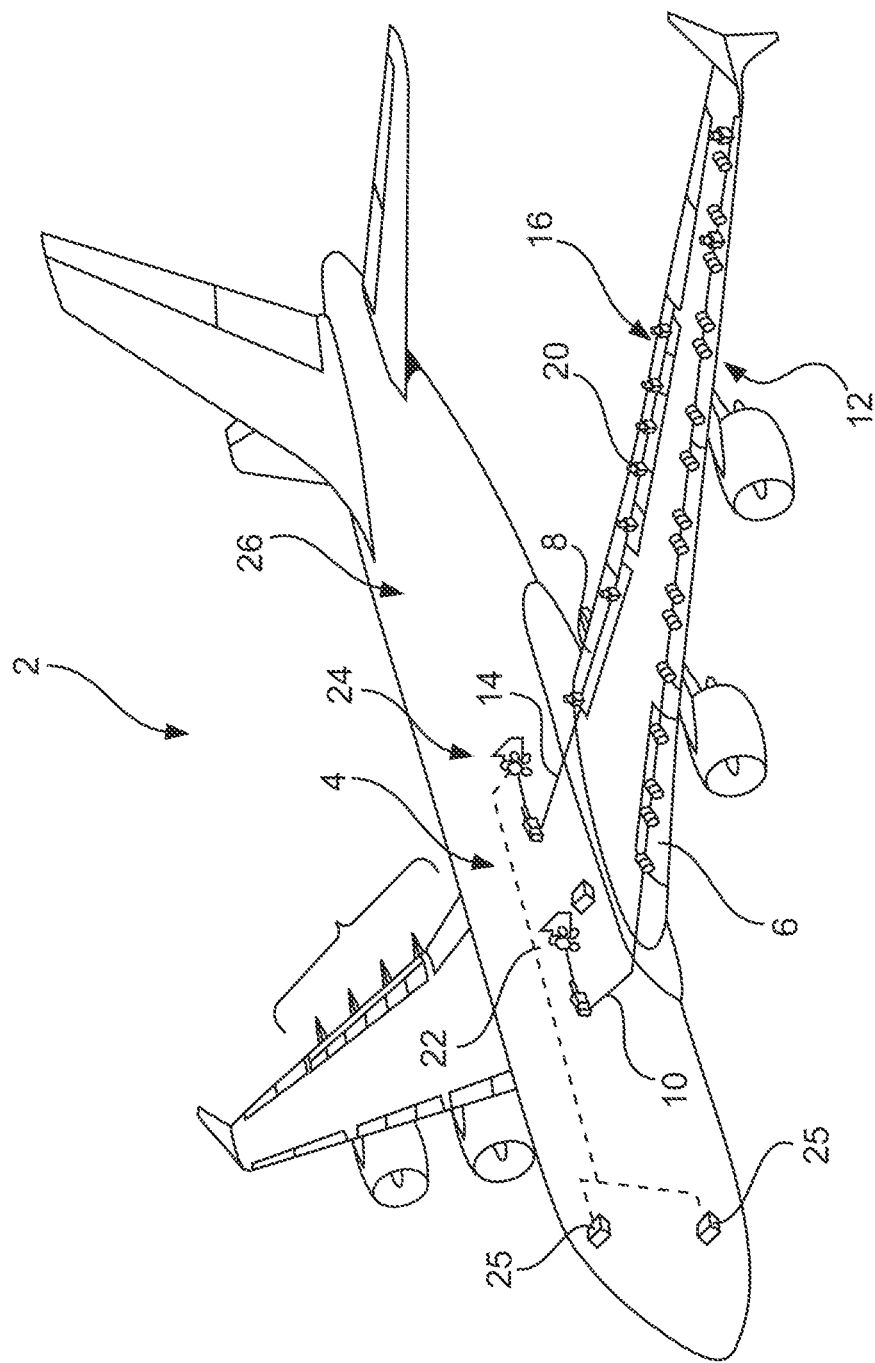
FIG. 1 shows a general overview of an aircraft with a drive system for driving control surfaces.

FIG. 1 shows a general overview of an aircraft 2 having a drive system 4 for driving control surfaces 6 (leading edge slats) and 8 (trailing edge flaps). The drive system 4 comprises a first transmission shaft 10 located at a wing leading edge 12 as well as a second transmission shaft 14 located at a wing trailing edge 16. Several drive stations 18 and 20 are distributed along the leading edge 12 and the trailing edge 16, respectively. The drive stations 18 and 20 are designed for converting rotary power into a translational movement of the control surfaces 6 and 8.

The transmission shaft 10 and 14 are driven by drive units 22 and 24, exemplarily located inside the fuselage 26 of the aircraft 2. These drive units 22 and 24 are usually referred to as PCU and in one example, comprise two motors, one hydraulic motor and one electric motor for providing a hybrid operation. Two independent Slat Flap Computers (SFCC) 25 may control and monitor the system.

Figure 2:
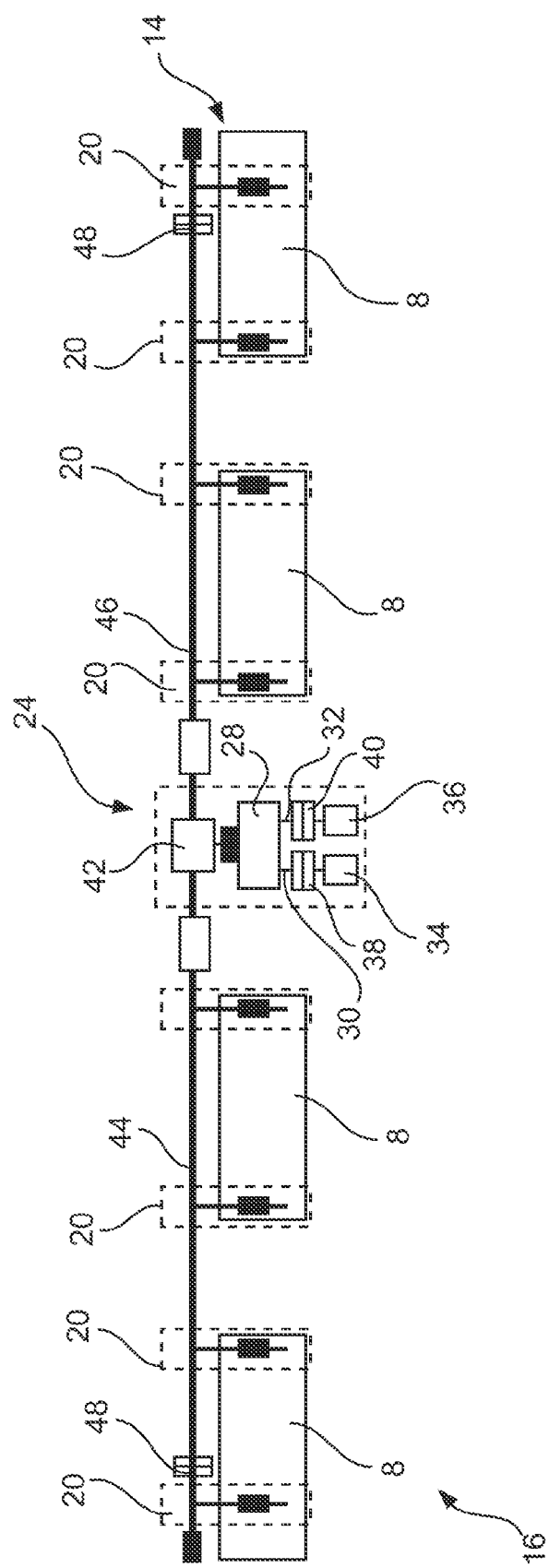
FIG. 2 shows a part of the drive system in a schematic view.

In FIG. 2, the transmission shaft 14 arranged at the trailing edge 16 is shown in a schematic view. The PCU 24 hereby comprises a differential gear 28 with two input shaft sections 30 and 32 to which two motors 34 and 36 are coupled, each via one power-off brake 38 and 40, respectively. A power-off brake for a hydraulic motor may be a pressure-off brake that is activated automatically on a loss of pressure. The differential gear 28 may be a speed-summing differential gear 28 that rotates a distribution gear section 42 to which two transmission shaft sections 44 and 46 are coupled.

Drive stations 20 are distributed along the transmission shaft sections 44 and are coupled to control surfaces 8. Exemplarily, two drive stations 20 are coupled to two edges of a single control surface 8 in order to drive it. Additionally, to prevent a failure in the drive system in case of a shaft break or a similar event, wing tip brakes 48 are arranged at end sections of the transmission shaft sections 44. By activating these wing tip brakes 48 the whole shaft section 44 may be arrested.

Figure 3:
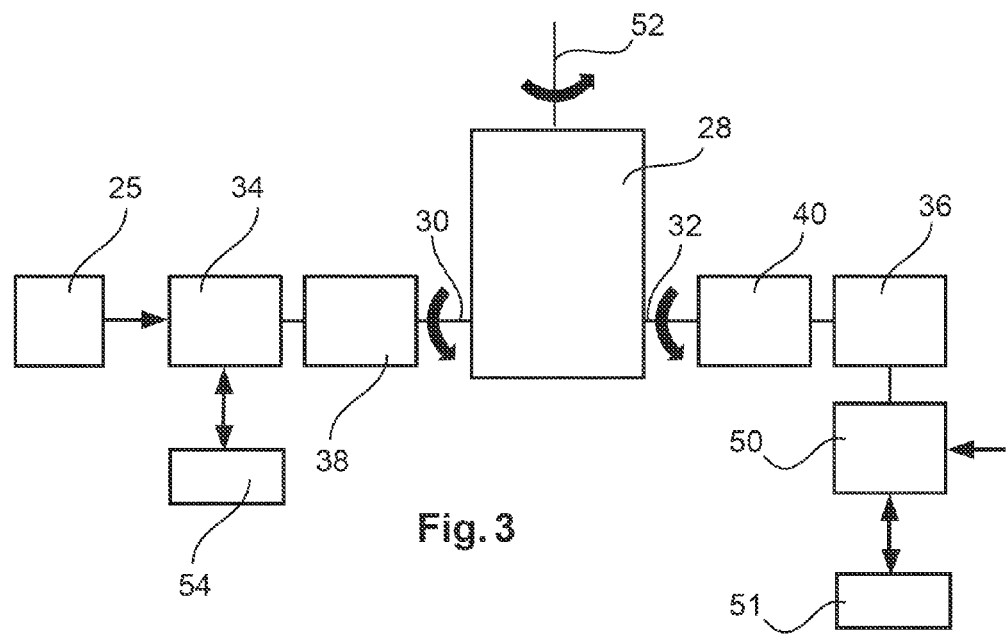
FIG. 3 shows a simplified block-oriented schematic view of the part of the drive system shown in FIG. 2 in a first mode of operation.

According to FIG. 2, the PCU 24 exemplarily comprises an electric motor 36 and a hydraulic displacement machine 34. As shown in FIG. 3 the electric motor 36, controlled by a motor control electronic 50, may provide rotational power over the power-off brake 40 into the respective input shaft 32 of the differential gear 28. At the same time the hydraulic displacement machine 34 provides rotational power over the power-off brake 38 into the respective input shaft 30 of the differential gear 28. This leads to the rotation of a transmission output 52 of the differential gear 28. In case only one of the electric motor 36 and the hydraulic displacement machine 34 supplies rotational power to the transmission output 52, the power-off brake of the other motor, which is in a standby state, is arrested. Thereby, the respective input shaft 30 or 32 is arrested such that the input of rotary power from the other input shaft 30 or 32 leads to the rotation of the transmission output 52.

As the exemplary control surfaces 6 and 8 shown in FIG. 1 are high-lift control surfaces, the transmission sections 44 and 46 are powered seldomly. Most of the time they are arrested, e.g. by the PCU itself in a high lift mode or by the wing tip brakes 48 in case the control surfaces are retracted or in failure cases, and are in a standby state, waiting for the next high-lift flight state. In the default high lift operating mode the wing tip brakes 48 are released and the PCU 24 is providing power to operate the high lift system with the commanded speed into any gated position.

For the hydraulic displacement machine 34 a digitally controlled over-center variable displacement motor may be used. The electric motor 36 may be a digitally controlled brushless DC motor. The control of the motors 34 and 36 may be established by a closed loop layout to maintain speed and torque command inputs. The control algorithms are implemented in a controller, which is provided with all required data to control the motors. For example, the controller may be integrated in an existing controller of the aircraft, such as an SFCC 25.

The hydraulic displacement machine 34 is supplied by an aircraft hydraulic supply system 54, while the electric motor 36 is supplied with electric power by an aircraft electrical busbar 51. A manifold as part of the hydraulic displacement machine 34 may be interfacing with the SFCC 25 and the hydraulic supply system 54 and contains all components to pressurize the hydraulic displacement machine 34 and to control the respective pressure-off brake 38.

For the electric motor 36 the motor control electronic 50 may be interfacing with the SFCC 25 and the aircraft electrical busbar 51. The motor control electronic 50 converts the electric power as required for the brushless DC motor or any other type of electric motor 36.

Figure 4:
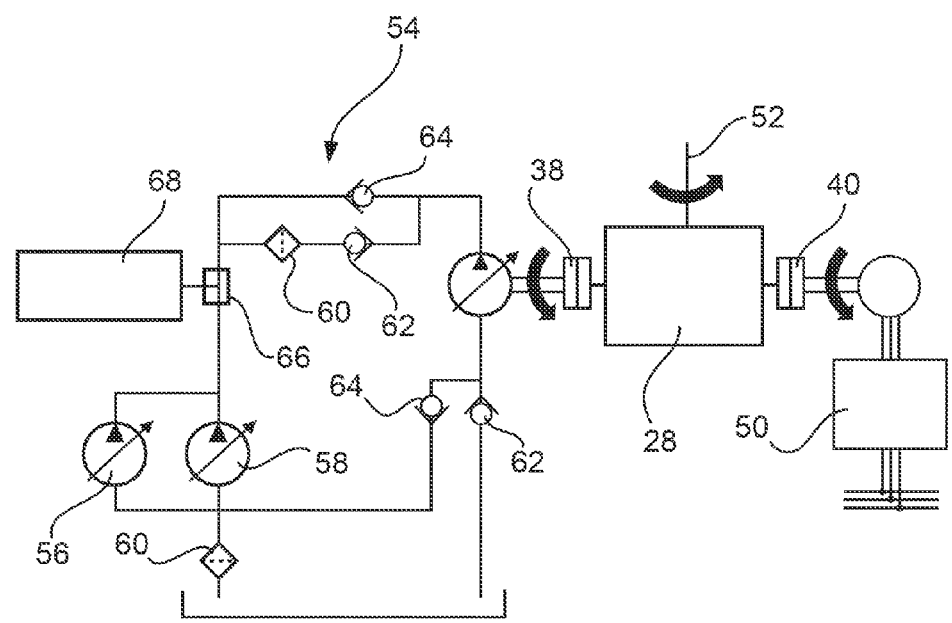
FIG. 4 shows a hydraulic system coupled with a part of the drive system in a schematic view in a first mode of operation.

According to FIG. 4, the electric motor 36 and the hydraulic motor 34 are coupled with the differential gear 28 and power the transmission output 52. The torque and hence the speed of the hydraulic displacement machine 34, e.g. realized as an over-center variable displacement machine, is controlled by commanding the motor swash plate into the required position. The hydraulic power is provided by the associated hydraulic system 54. The motor flow demand is, as part of the closed loop control algorithm, limited with the objective not to overload the hydraulic supply system 54. This requires information regarding the hydraulic pressure provided by a pressure transducer as part of a hydraulic drive channel and pressure data provided by the hydraulic system 54 to the motor controller. The electric motor closed loop speed control is established accordingly.

The associated hydraulic system 54 is generally pressurized by engine driven pumps 58. Additionally the hydraulic system 54 is usually equipped with electric motor pumps 56 to provide the hydraulic power in case the engine driven pumps are not active, e.g. in a ground or failure case, or to increase the power of the hydraulic system in case of high flow demand. Besides that, filters 60, check valves 62 and 64 and connecting sections 66 for the integration of other hydraulic loads 68 are present for filtering hydraulic fluid and for assigning flow directions.

Figure 5:
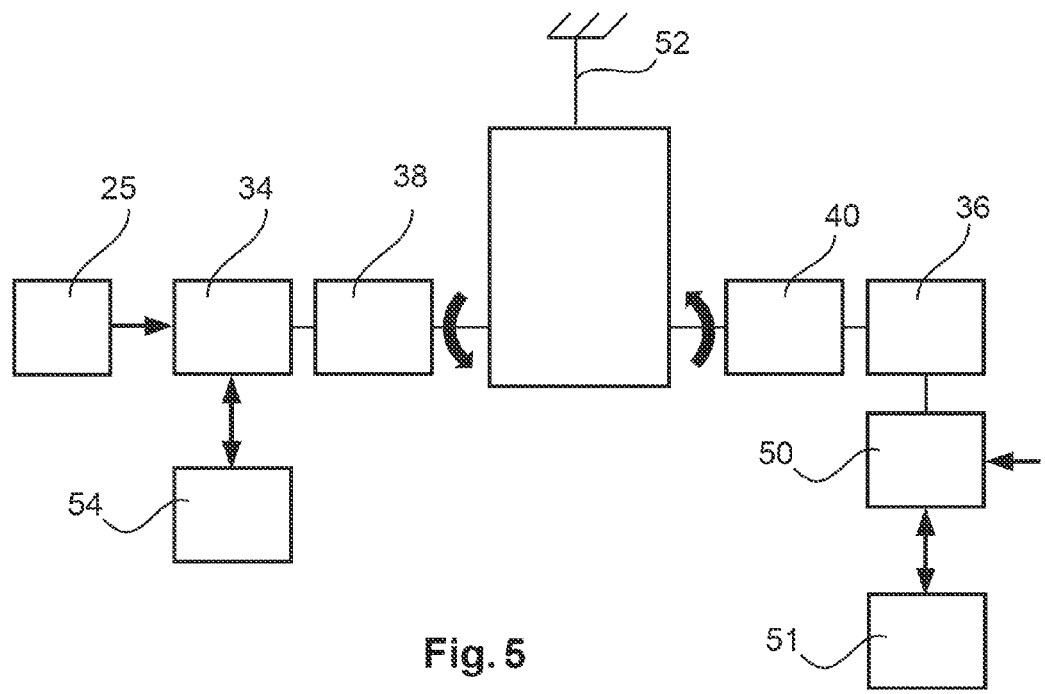
FIG. 5 shows a simplified block-oriented schematic view of the part of the drive system shown in FIG. 2 in a second mode of operation.

As indicated above and shown in FIG. 5, electric power may be converted into hydraulic power by simply arresting the transmission output 52 and rotating the electric motor 36 such that the hydraulic displacement machine 34 rotates in an opposite direction through the differential gear 28. Generally, the objective is to use a hybrid PCU of a high lift system also as an electric motor pump within the aircraft hydraulic supply system 54. A hybrid PCU, equipped with a digital controlled over-center variable displacement hydraulic displacement machine 34 and an electric motor 36 coupled via a differential gear 28, comprises all features required for an electric motor pump to pressurize the aircraft hydraulic system 54. To operate the hybrid PCU in an electric motor pump mode the transmission output 52 of the differential gear 28 is locked by engagement of the wing tip brakes 48 as first brakes. The power-off brakes 38 and 40 as second and third brakes associated to each motor 34 and 36 are released by corresponding command inputs, e.g. by the SFCC 25. This provides power flow from the electric motor 36 to the hydraulic displacement machine 34 via the differential gear 28. In this configuration the high lift system is safely fixed by the wing tip brakes 48. After operation of the PCU 24 as an electric motor pump the reaction torque in the transmission is relieved by a corresponding sequence already implemented for the high lift application.

Figure 6:
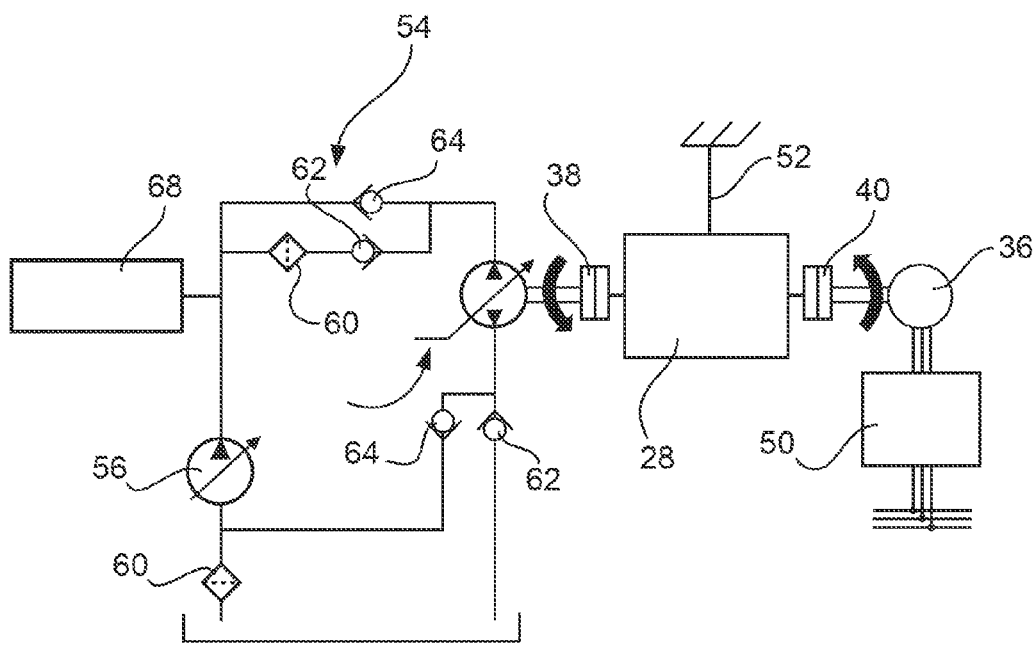
FIG. 6 shows a hydraulic system coupled with a part of the drive system in a schematic view in a second mode of operation.

This is further depicted in FIG. 6 where the transmission output 52 is arrested and the hydraulic displacement machine 34 is driven and rotates. Due to the rotation, a hydraulic pressure is generated and fed into the hydraulic system 54. By controlling the hydraulic motor 34, e.g. through a controller interface 70 connected to the SFCC 25 or any other control logic, the generated pressure as well as the generated volume flow is controllable.

Alternatively the pump performance can be controlled by adjusting the speed of the electric motor 36 depending on the required flow to maintain the hydraulic system pressure. In this case the pump displacement is controlled and maintained into a fixed position by the spring loaded swash plate actuation mechanism and corresponding command input from the controller.

Generally, a swash plate actuation mechanism of the hydraulic motor 34, e.g. in form of an over-center hydraulic drive, is spring loaded to provide an initial pump displacement for start-up when the hydraulic system 54 is not yet pressurized. The electric motor 36 is commanded to a desired speed, in one example, by the SFCC or any other controller. The electric motor 36 is now powering the hydraulic motor 34 via the differential gear 28. In consequence of the initial swash displacement the hydraulic motor 34 is operating in a pump mode and is pressurizing the hydraulic system 54. The hydraulic interface to the PCU is adapted to the needs for a hydraulic pump.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A method for generating hydraulic power in an aircraft, the aircraft having a drive system comprising at least one transmission shaft connected to a hybrid power control unit, the power control unit having an electric motor and a hydraulic displacement machine connected to a differential gear unit for driving a common output shaft, the method comprising:
   arresting the output shaft;
   rotating the electric motor such that the hydraulic displacement machine is driven due to the arrested output shaft; and
   supplying the fluid flow into a hydraulic system of said aircraft.

2. The method of claim 1, wherein arresting the output shaft comprises arresting at least one first brake connected to the at least one transmission shaft.

3. The method of claim 2, wherein the at least one first brake is at least one wing tip brake.

4. The method of claim 1, wherein rotating the electric motor includes releasing a second brake at the hydraulic displacement machine and a third brake at the electric motor.

5. The method of claim 4, wherein the second brake is a pressure-off brake and wherein releasing the second brake includes driving a brake release unit coupled with the pressure-off brake to release the pressure-off brake in case the corresponding hydraulic system is not pressurized.

6. The method of claim 1, wherein a control unit controls at least one of the speed of the electric motor and a displacement of the hydraulic displacement machine for adjusting a resulting hydraulic pressure or flow rate.

* * * * *